(12) United States Patent
Finlayson et al.

(10) Patent No.: US 8,752,207 B2
(45) Date of Patent: Jun. 10, 2014

(54) SECURITY TOKEN AND SYSTEM AND METHOD FOR GENERATING AND DECODING THE SECURITY TOKEN

(75) Inventors: David Ian Finlayson, Heathcote (AU); Mark Alexander Stocks, Glebe (AU)

(73) Assignee: Secure Keys PTY Limited, Thornleigh NSW (AU)

( * ) Notice: Subject to any disclaimer, the term of this patent is extended or adjusted under 35 U.S.C. 154(b) by 404 days.

(21) Appl. No.: 12/600,792

(22) PCT Filed: May 19, 2008

(86) PCT No.: PCT/AU2008/000702
§ 371 (c)(1),
(2), (4) Date: Jan. 11, 2010

(87) PCT Pub. No.: WO2008/141376
PCT Pub. Date: Nov. 27, 2008

(65) Prior Publication Data
US 2010/0180339 A1 Jul. 15, 2010

(30) Foreign Application Priority Data

May 18, 2007 (AU) ................................ 2007902671

(51) Int. Cl.
*G06F 7/04* (2006.01)
(52) U.S. Cl.
USPC .................................. 726/30; 726/26; 726/27
(58) Field of Classification Search
USPC ............ 726/2–10, 26–30; 713/150, 164–167, 713/176, 189, 193; 707/999.01, 999.009
See application file for complete search history.

(56) References Cited

U.S. PATENT DOCUMENTS

| | | | | | |
|---|---|---|---|---|---|
| 4,984,272 | A | * | 1/1991 | McIlroy et al. | 726/17 |
| 5,113,442 | A | * | 5/1992 | Moir | 713/167 |
| 5,283,830 | A | * | 2/1994 | Hinsley et al. | 1/1 |
| 5,584,022 | A | * | 12/1996 | Kikuchi et al. | 1/1 |
| 5,848,232 | A | * | 12/1998 | Lermuzeaux et al. | 726/21 |
| 5,987,134 | A | * | 11/1999 | Shin et al. | 713/159 |
| 6,023,765 | A | * | 2/2000 | Kuhn | 726/4 |
| 6,073,234 | A | * | 6/2000 | Kigo et al. | 713/161 |
| 6,189,036 | B1 | * | 2/2001 | Kao | 709/229 |
| 6,289,462 | B1 | * | 9/2001 | McNabb et al. | 726/21 |

(Continued)

FOREIGN PATENT DOCUMENTS

| | | |
|---|---|---|
| JP | H08339352 A | 12/1996 |
| JP | H11272616 A | 10/1999 |

(Continued)

OTHER PUBLICATIONS

Hwang, Min-Shiang et al. "An Access control Scheme based on Chinese Remainder Theorem and Time Stamp Concept," 1996, vol. 15, Issue 1, pp. 73-81.*

(Continued)

*Primary Examiner* — Darren B Schwartz
(74) *Attorney, Agent, or Firm* — Senniger Powers LLP (57) ABSTRACT

The present invention provides a system and method for encoding and decoding security labels utilizable in a computing system. The method for encoding includes, in part, ascribing an integer value to each one of a set of characteristics. Thereafter, to encode a particular security label, the integer values for each of the set of characteristics that describe the label are combined to arrive at a single integer value.

20 Claims, 9 Drawing Sheets

(56) References Cited

U.S. PATENT DOCUMENTS

| | | | |
|---|---|---|---|
| 6,405,202 B1* | 6/2002 | Britton et al. | 1/1 |
| 6,609,198 B1* | 8/2003 | Wood et al. | 713/155 |
| 7,702,693 B1* | 4/2010 | Aiyagari et al. | 707/785 |
| 2002/0099952 A1* | 7/2002 | Lambert et al. | 713/200 |
| 2003/0088786 A1* | 5/2003 | Moran et al. | 713/201 |
| 2003/0105979 A1* | 6/2003 | Itoh et al. | 713/201 |
| 2003/0196108 A1* | 10/2003 | Kung | 713/200 |
| 2003/0200436 A1* | 10/2003 | Eun et al. | 713/172 |
| 2004/0187020 A1* | 9/2004 | Leerssen et al. | 713/200 |
| 2004/0254934 A1* | 12/2004 | Ho et al. | 707/9 |
| 2005/0044409 A1* | 2/2005 | Betz et al. | 713/201 |
| 2005/0066164 A1* | 3/2005 | Simon | 713/156 |
| 2005/0097063 A1* | 5/2005 | Benaloh | 705/71 |
| 2006/0059567 A1* | 3/2006 | Bird et al. | 726/27 |
| 2006/0137006 A1* | 6/2006 | Ramzan et al. | 726/21 |
| 2006/0174334 A1* | 8/2006 | Perlin et al. | 726/9 |
| 2006/0277341 A1* | 12/2006 | Johnson | 710/200 |
| 2007/0256117 A1* | 11/2007 | Shomo | 726/2 |
| 2008/0028442 A1* | 1/2008 | Kaza et al. | 726/4 |
| 2009/0097640 A1* | 4/2009 | Fischer | 380/44 |

FOREIGN PATENT DOCUMENTS

| | | |
|---|---|---|
| JP | 2001312495 A | 11/2001 |
| JP | 2006215877 A | 8/2006 |
| JP | 2006338451 A | 12/2006 |
| JP | 2008546114 A | 12/2008 |
| WO | 2006132740 A2 | 12/2006 |

OTHER PUBLICATIONS

Lee, Kim S. et al. "A Hierarchical Single-Key-Lock Access Control using the Chinese Remainder Theorem," 1992, Proceeding SAC '92 Proceedings of the 1992 ACM/SIGAPP Symposium on Applied computing, pp. 491-496.*

Hwang, J.-J. et al. "A New Access Control Method using Prime Factorisation," 1992, The Computer Journal—Special issue on safety and security parallel computation, vol. 35, Issue 1, pp. 16-20.*

Chang, Henry Ker-Chang et al. "A Novel Access Control Method using Morton Number and Prime Factorization," Dec. 2000, Information Sciences, vol. 130, Issues 1-4, pp. 23-40.*

S. G. Akl and P. D. Taylor. "Cryptographic Solution to a Problem of Access Control in a Hierarchy." ACM Transactions on Computer Systems, 1(3):239-248, 1983.*

Henry Ker-Chang Chang et al. "A Novel Access Control Method using Morton Number and Prime Factorization," Information Sciences, vol. 130, Issues 1-4, Dec. 2000, pp. 23-40.*

M. S. Hwang, W. G. Tzend and W. P. Yang, "A Two-Key-Lock-Pair Access Control Method Using Prime Factorization and Time Stamp", IEICE Trans. Information and System, vol. E77-D, No. 99, 1994, pp. 1042-1046.*

Linux Permissions (retrieved Jun. 25, 2008) retrieved from internet <http://web.archive.org/web/20060509141252/http://www.zzee.com/solutions/linux-permissions.shtml>, published on May 09, 2006 Wayback Engine, 5 pages.

Learning the shell (retrieved Jun. 25, 2008) retrieved from the internet <http://web.archive.org/web/20030712084700/http://linuxcommand.org/lts0070.php>, published on Jul. 12, 2003, Wayback Engine, 6 pages.

Chang, C. et al. "A Binary Single-Key-Lock System for Access Control," IEEE Transactions on Computers, vol. 38, No. 10, Oct. 1989, pgs. 1462-1466.

SIPO Office Action, Chinese Application No. 20080016593.3, Feb. 18, 2013, 12 pgs.

JPO Office Action, Japanese Application No. 2010-508667, Feb. 12, 2013, 9 pgs.

EPO Supplementary Search Report, European Application No. 08747971.3, Sep. 5, 2012, 6 pgs.

* cited by examiner

SECURITY TOKEN AND SYSTEM AND METHOD FOR GENERATING AND DECODING THE SECURITY TOKEN

FIELD OF THE INVENTION

The present invention relates to a security token, and a system and method for generating and decoding the security token. The system provides particular, but not exclusive, use in a computing system where a 'trusted paradigm' security system is utilised.

BACKGROUND OF THE INVENTION

Computing systems are utilised to store, categorise and deliver many types of information to a wide variety of users. The advent of sophisticated database structures, increased computing power, new search algorithms and an exponential growth in publicly available computer networks, such as the Internet, has seen many enterprises provide at least a portion of their goods, services and information via the Internet.

The security of information held in a computing system is a paramount consideration for many enterprises. For example, in the medical field, access to patient information is governed by strict legal rules by which users can access information.

This has led to the creation of complex systems for setting particular "permission levels" in computing systems. That is, many computing systems include a multi-tiered access system, where different users may have different levels of access to different types of information. The ability to access information may be determined by a permission level attributed to a user, a permission level attributed to a piece of information, or a combination of the two.

The permission levels are often encoded in a particular way. One such way is the encoding of the permission levels into a "bit vector". That is, an array of bits, where each bit represents a different aspect of the permission level.

SUMMARY OF THE INVENTION

In a first aspect, the present invention provides a method for encoding a security label utilisable in a computing system where an integer value is ascribed to each one of a set of characteristics, comprising the steps of for a particular label, combining the integer values for each of the actual set of characteristics that describe the label to arrive at a single integer value.

The integer value ascribed to each one of the set of characteristics may be determined by an exponential in the form $x^y$, where x and y are integer values. The integer values may be combined by summing the integer values.

In an alternative embodiment, the integer value ascribed to each one of the set of characteristics is a unique prime number. In this embodiment, the integer values are combined by multiplying the integer values.

The method may include the further step of, for the step of ascribing an integer value to each one of the set of characteristics capable of describing the label, incrementing the exponential y for each one of the set of characteristics.

The set of characteristics may be one of a permission level or a compartment. The combination known as a security label.

In a second aspect, the present invention provides a method for allowing a user to access a piece of information contained in a computing system, comprising the steps of ascribing a security label to all discrete pieces of information in the computing system, ascribing a security label to all users of the computing system, and ascribing a security label to all software applications residing on the computing system, wherein, to access a discrete piece of information, the security label of the user and the software application must dominate the security label ascribed to the discrete piece of information.

In a third aspect, the present invention provides a method for constructing a list containing information pertaining to whether each one of a plurality of users may access each one of a plurality of pieces of information contained in a computing system, comprising the steps of, determining a security token for each one of the users and a security token for each one of the pieces of information in accordance with a first aspect of the invention, determining whether each of the plurality of users may access the each one of the plurality of pieces of information in accordance with a second aspect of the invention, and constructing a list of the security tokens and access permissions.

In a fourth aspect, the present invention provides a method for decoding a security label in accordance with a first aspect of the invention, comprising the steps of determining the floor of the log base of the single integer value to determine a value for a first one of the set of characteristics, subtracting the floor of the log base of the single integer value from the integer value to produce a remainder integer value, and if the remainder value is non-zero, determining the floor of the log of the remainder integer value to determine a further one of the set of characteristics, wherein the process is iterated until the remainder value is zero.

In a fifth aspect, the present invention provides a software application including instructions for controlling a computing system, to perform a method in accordance with a first aspect of the invention.

In a sixth aspect, the present invention provides a recordable media incorporating a software application in accordance with a fifth aspect of the invention.

In a seventh aspect, the present invention provides a system capable of performing the method steps of any one of the first, second and third aspects of the invention.

DETAILED DESCRIPTION OF THE DRAWINGS

Features of the present invention will be presented in a description of an embodiment thereof, by way of example, with reference to the accompanying drawings, in which.

DESCRIPTION OF AN EMBODIMENT

Figure 1:
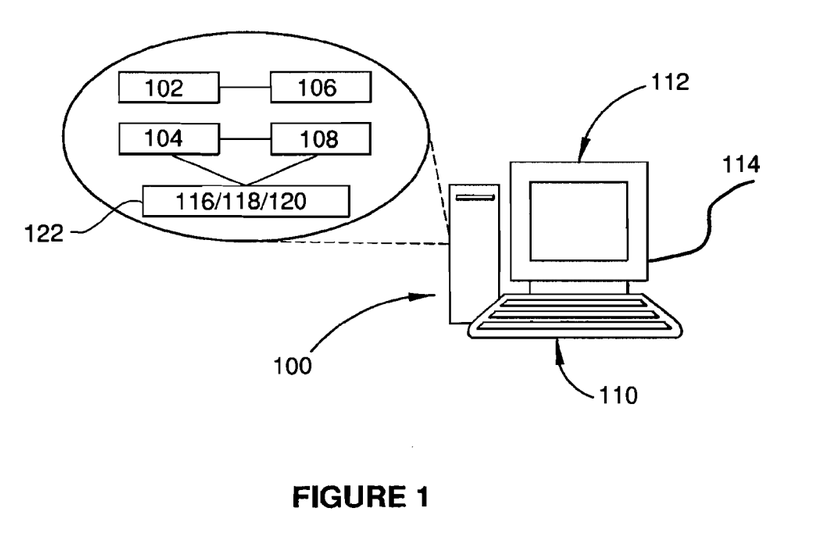
FIG. 1 depicts a computing system suitable for executing a software application in accordance with an embodiment of the present invention.

At FIG. 1 there is shown a schematic diagram of a computing system 100 suitable for use with an embodiment of the present invention. The computing system 100 may be used to execute applications and/or system services such as a tournament structure in accordance with an embodiment of the present invention. The computing system 100 preferably comprises a processor 102, read only memory (ROM) 104, random access memory (RAM) 106, and input/output devices such as disk drives 108, input peripherals such as a keyboard 110 and a display (or other output device) 112. The computer includes software applications that may be stored in RAM 106, ROM 104, or disk drives 108 and may be executed by the processor 102.

A communications link 114 connects to a computer network such as the Internet. However, the communications link 114 could be connected to a telephone line, an antenna, a gateway or any other type of communications link. Disk drives 108 may include any suitable storage media, such as, for example, floppy disk drives, hard disk drives, CD ROM drives or magnetic tape drives. The computing system 100 may use a single disk drive 108 or multiple disk drives. The computing system 100 may use any suitable operating systems 116, such as Microsoft Windows™ or a Unix™ based operating system.

The system further comprises a software application 118, which in the present embodiment includes a database. The software application 118 may interface with other software applications 120 or with a remote computer (not shown) via communications link 114. This collection of computer instructions, software, operating system(s), and/or applications, collectively represented at 122, can be stored in ROM 104, on disk drive 108 or multiple drives, or some combination thereof.

The software application 118 embodies an example of the present invention, and is utilised to control access to the database, using, amongst other devices, a trusted system paradigm. A trusted security paradigm is one where particular tokens (security labels) are defined, the token being representative of a set of characteristics which are unique to the information to which they are associated. System access is restricted by a series of levels (and compartments as tokens). A user must have a level greater than the level of information they are attempting to gain access to is the notion of a user needing a level greater than the level of information they are accessing is sometimes referred to as mandatory access control. For example, a token may indicate a 'security level' or 'permission level' of a particular file held in a database. The token may also be used to indicate other characteristics of the data, such as a particular 'compartment' within a security level.

For example, using mathematical nomenclature, a token may be represented by the following semantic expression:

Token=security_level{set of security compartments}

This expression can be more easily understood with reference to Example 1. In Example 1, the data types and tokens are customised to be applicable to a security database for holding medical/biological information.

| 'Highly sensitive' | {'personal id', 'data analysis results'} |
|---|---|
| 'Sensitive' | {'DNA results', 'colposcopy results'} |
| 'Sensitive' | {'security management'} |
| 'Restricted' | {'HPV statistics'} |
| 'Public' | {'HPV risk factors'} |

Example 1

Sample Token Structure 1

In other words, a series of tokens may be defined, at a conceptual level, as a number of permission levels, each permission level being associated with one or more compartments (i.e. types of information which fall within the permission level). For example, personal identification information and data analysis results are regarded as highly sensitive information, whereas general information about HPV risk factors would be considered public information.

In the prior art, one approach to codifying permission/security levels and compartments into a format that is compatible with computing systems has been to use a bit vector, where each bit (or series of bits) represents the categories of level and compartment. The bit vector which includes the codified information is generally referred to as a "token".

Embodiments of the present invention, in contrast, encode all of a token's semantics into a single integer.

One embodiment of the algorithm utilises an exponential form of $x^y$ to create a separation between label semantics, where x is any common whole number base and y is any whole number exponent.

Therefore, referring to Example 1, the levels and compartments may be encoded as shown below, in Example 2.

'personal identifiers'=$2^1$=2
'data analysis results'=$2^2$=4
'DNA results'=$2^3$=8
'colposcopy results'=$2^4$=16
'security management'=$2^5$=32
'HPV statistics'=$2^6$=64
'HPV risk factors'=$2^7$=128
'Highly sensitive'=$2^{11}$=2048
'Sensitive'=$2^{10}$=1024
'Restricted'=$2^9$=512
'Public'=$2^8$=256

Example 2

Encoded Values for Each Level/Compartment

Figure 2:
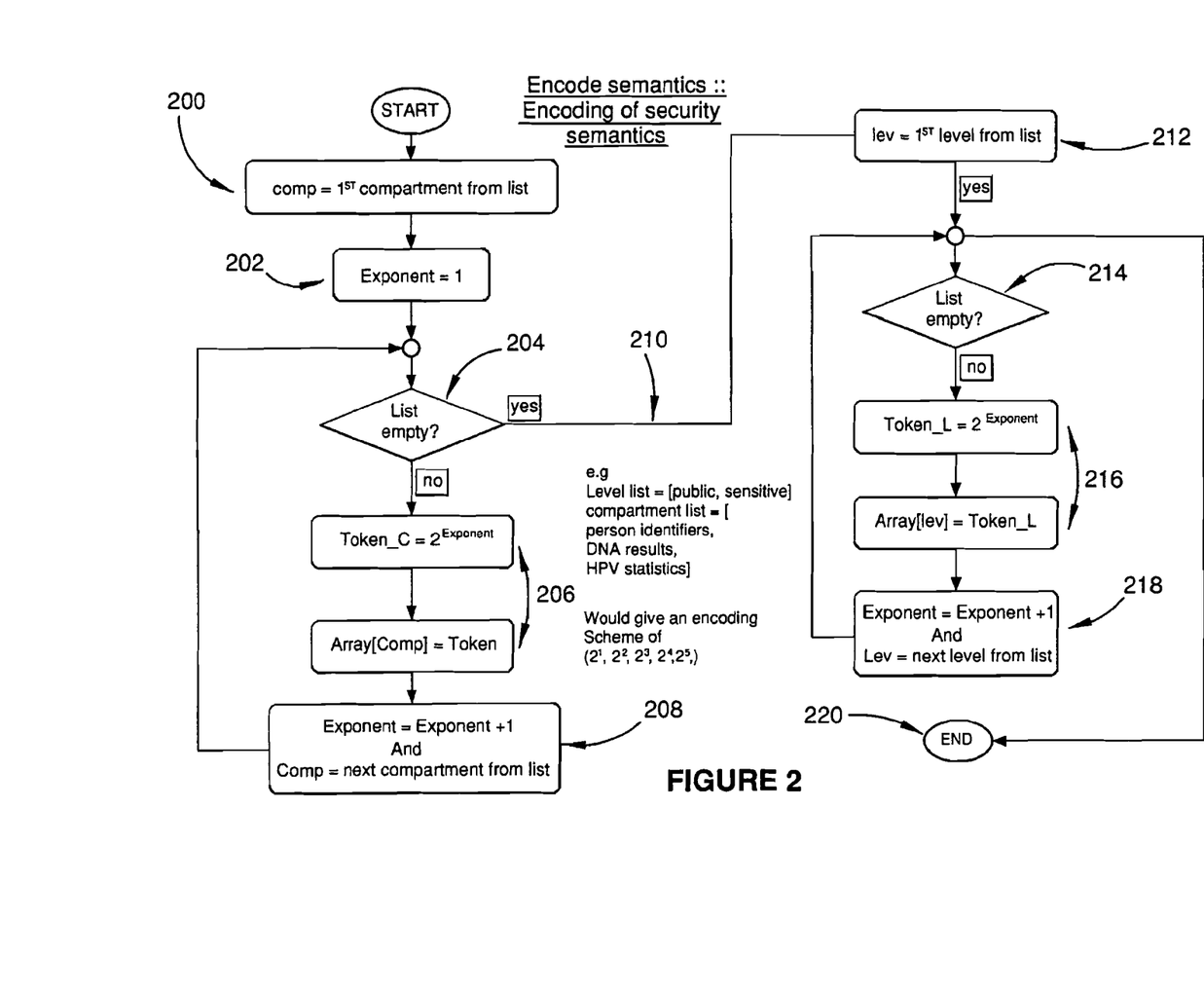
FIGS. 2 and 5 are flowcharts depicting alternate process for encoding a set of labels for a security system in accordance with embodiments of the present invention.

The method steps of ascribing values to each label in a set of labels is shown in FIG. 2. At steps 200 and 202, the compartment list is selected, and an initial exponent of 1 is chosen respectively. In other words, the value for the first compartment becomes $2^1$=2. At 204, the compartment list is checked to determine whether there are any compartments. If so, then the first token is ascribed to the first compartment (206).

Thereafter, the exponent is incremented, and the next compartment in the list is selected (208). The method subsequently returns to step 204, to determine whether the list is empty. This process is iterated until such time as the compartment list is empty (210).

Once the compartment list is empty, a similar series of method steps are utilised to ascribe token values to each of the levels. Firstly, the first level from the list of levels is selected (212).

At 214, the level list is checked to determine whether there are any more levels. If so, then the token is ascribed to the first level (216).

Thereafter, the exponent is incremented, and the next level in the list is selected (218). The method subsequently returns to step 214, to determine whether the list is empty. This process is iterated until such time as the level list is empty (220).

Once each level/compartment is ascribed a value in the exponential form $x^y$, then a specific token which is to be ascribed to a particular file/user may be encoded by adding the resultant level/compartment values.

Figure 3:
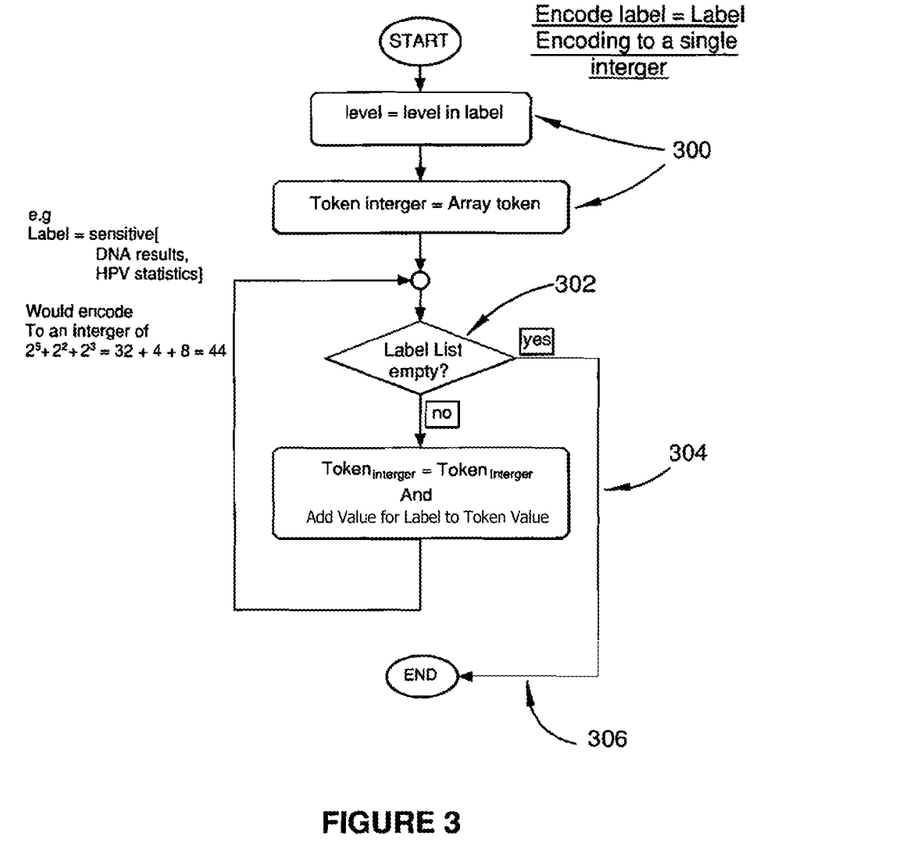
FIGS. 3 and 6 are flowcharts depicting alternate processes for encoding a particular token (security label) for a security system in accordance with embodiments of the present invention.

The method steps for this process are outlined in FIG. 3, where a particular label is encoded. Firstly at 300, the value for the level is ascribed to the token. Secondly at, the compartment list is accessed, to determine whether it is empty (302). If not, then the value of the label is added to the token value (304). This process is iterated until all compartment values have been added to the token. Once all values have been added (i.e. the compartment list is empty), the process ends (306).

The process may also be described by reference to the example below. Data which is highly sensitive and relates to both personal identifiers and data analysis results is ascribed the label 'Highly sensitive' {'personal identifiers', 'data analysis results'} is encoded as:

$$2^{11}+2^1+2^2=2048+2+4=2054$$

In another example, the label data which is publicly available and relates to HPV risk factors can be ascribed the label 'Public' {'HPV risk factors'} which is encoded as:

$$2^8+2^7=256+128=384$$

The numerical distance between each value of x' ensures that every possible combination of added values is represented by a unique integer number.

If the initial labels are encrypted, the encoding process remains valid and the algorithms may still be employed.

For example, referring to Example 2, the label 'personal identifiers', can first be transformed to an encrypted string using a one way encryption algorithm, prior to being encoded as an integer.

'personal identifiers'→'$#&RERs*Er %$m<ydfg' which is then encoded as an integer:

'$#&RERs*Er %$m<ydfg'=$2^1$=2

In this way, labels may be obfuscated further.

Decoding the integer to arrive at the appropriate semantic structure (i.e. combination of levels and compartments) may be achieved by iteratively identifying the most significant exponent associated with the integer (ignoring the remainder) to arrive at the first level/compartment, subsequently subtracting the most significant component from the integer total to arrive at a "remainder" and then repeating above process, until there is no remainder.

Figure 4:
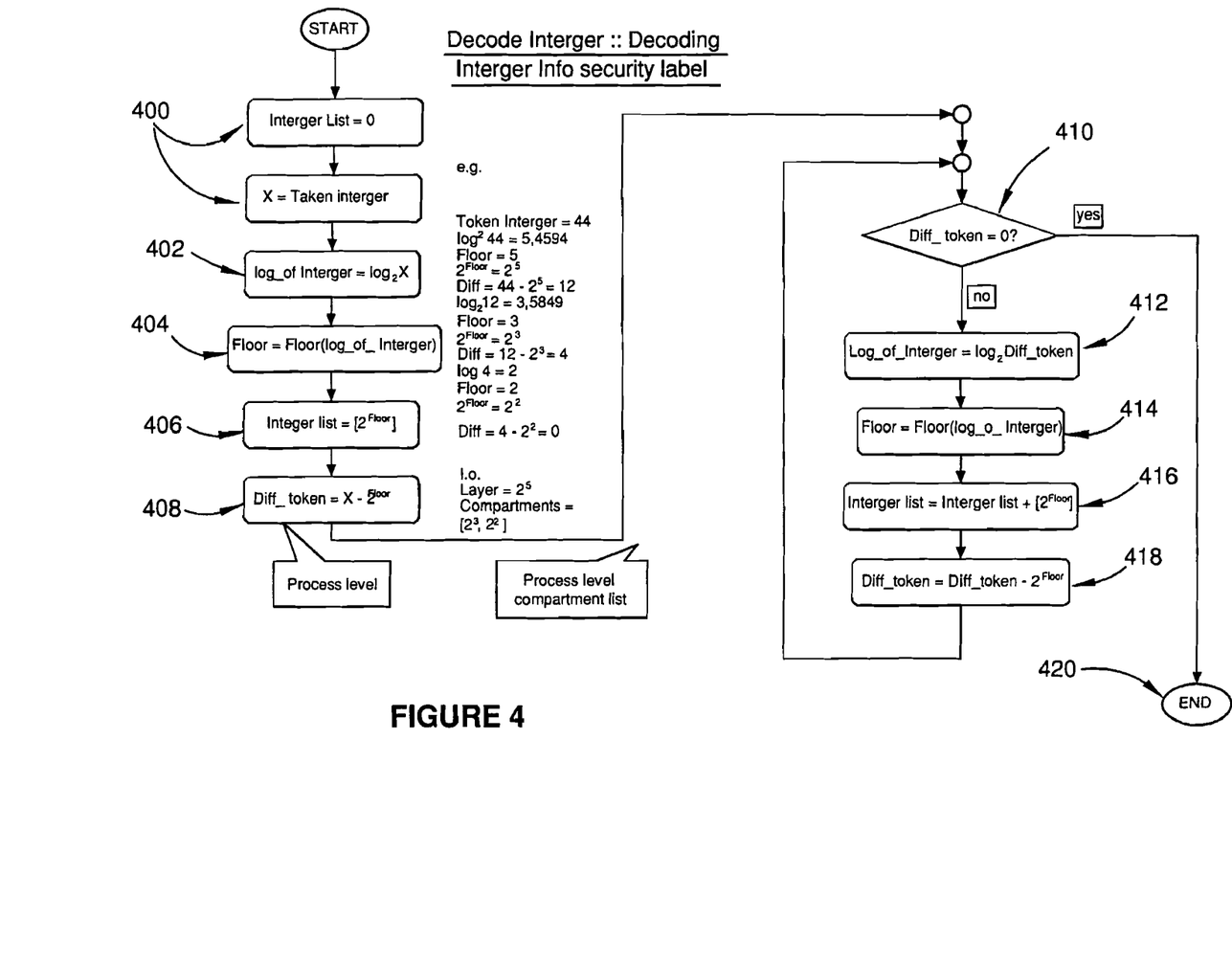
FIGS. 4 and 7 are flowcharts depicting alternate processes for decoding a particular token (security label) for a security system in accordance with embodiments of the present invention.

The decoding methodology is shown in FIG. 4. At step 400, the token integer is received by the process. The log of the integer is taken (402) and the floor of the log of the integer is taken (404). This value becomes the first integer in the list (which represents the level of the token) (406). Subsequently, the floor of the log of the integer is subtracted from the original token integer, to produce a difference token (408). If the difference token is non-zero (compartments are known to be encoded in the difference token) (410), then the log of the difference token is taken (412) and the floor of the log of the difference token is taken (414). This value becomes the next integer in the list (which represents the first of the compartments in a compartment list)(416) (i.e. the value of the second token). Subsequently, the floor of the log of the integer is subtracted from the difference token integer, to produce a second difference token (418). If the second difference token is also non-zero (410), then the method steps are repeated until the difference token is zero (420), at which point all the tokens (compartments) have been decoded and the process ends.

In another example, decoding the integer 2054 would require the following steps:
1. $\log_2(2054)=11.004220466318195$;
2. floor(log)=11;
3. Hence the most significant element is $2^{11}$, which corresponds to the level 'highly sensitive';
4. Subtract $2^{11}$ from 2054=2054-2048=6;
5. $\log_2(6)=2.5849625007211561$;
6. floor(log)=2;
7. Hence the next most significant element is $2^2$, which corresponds to the compartment 'data analysis results';
8. Subtract $2^2$ from 6=6-4=2;
9. $\log_2(2)=1$;
10. floor(log)=1=$2^1$;
11. Hence the next most significant element is $2^1$, which corresponds to the compartment 'personal identifiers';
12. As there is no remainder, all levels/compartments have been identified and the original has been reconstructed.

From the example above, it can be seen that the token for the integer value 2054 is 'Highly sensitive'{'personal id', 'data analysis results'}

Example 3

Sample Token Structure 2

Another embodiment of the algorithm utilises prime numbers to create a separation between label semantics.

Therefore, referring again to Example 1, the levels and compartments may be encoded as shown below, in Example 3.

'personal identifiers'=1
'data analysis results'=3
'DNA results'=7
'colposcopy results'=11
'security management'=13
'HPV statistics'=17
'HPV risk factors'=19
'Highly sensitive'=23
'Sensitive'=29
'Restricted'=31
'Public'=37

Example 4

Encoded Values for Each Level/Compartment Using Prime Numbers

Figure 5:
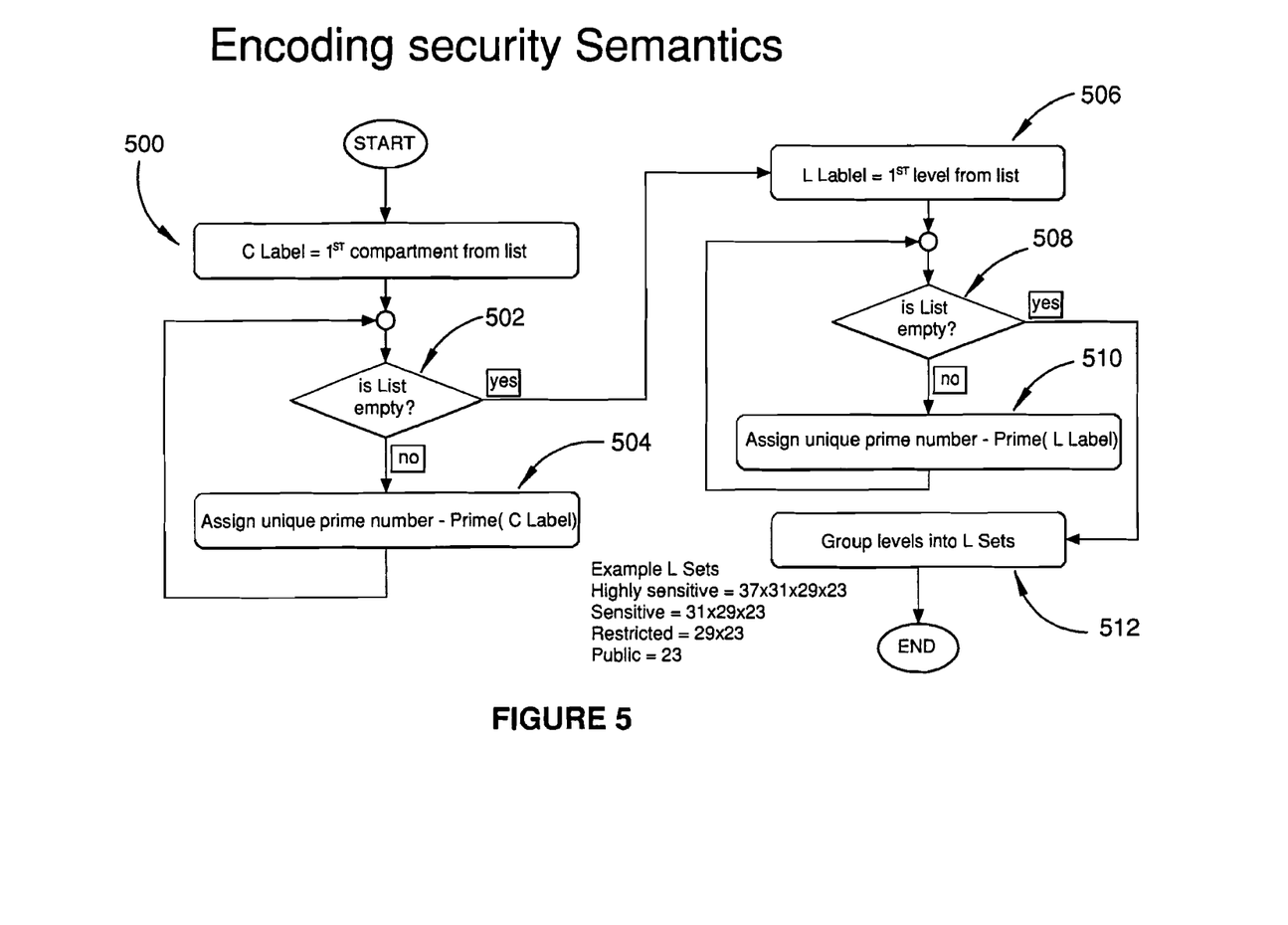

The method steps of ascribing values to each label in a set of labels is shown in FIG. 5. At step 500, the compartment list is selected, and a determination is made as to whether the list is empty (502). If not, a unique prime number is assigned to the compartment label. The method subsequently returns to step 502, to determine whether the list is empty. This process is iterated until such time as the compartment list is empty.

Once the label list is empty, a similar series of method steps are utilised to ascribe token values to each of the levels. If the list is empty, then all compartments are assigned and the first level from the label list is selected (506). A determination is made as to whether the list is empty (508).

If no, the prime number is incremented, and assigned to the next label (510). The method subsequently returns to step 508, to determine whether the list is empty. This process is iterated until such time as the compartment list is empty.

Once the label list is empty, the levels are grouped into relevant sets (512). For example, 'highly sensitive' and 'sensitive' and 'restricted' and 'public' is encoded as a set. i.e. it is implicit that if a level of 'highly sensitive' is required, then the other labels in the set of labels are also encoded.

Once each level/compartment is ascribed a unique prime number value, then a specific token which is to be ascribed to a particular file/user may be encoded by adding the resultant level/compartment values.

Figure 6:
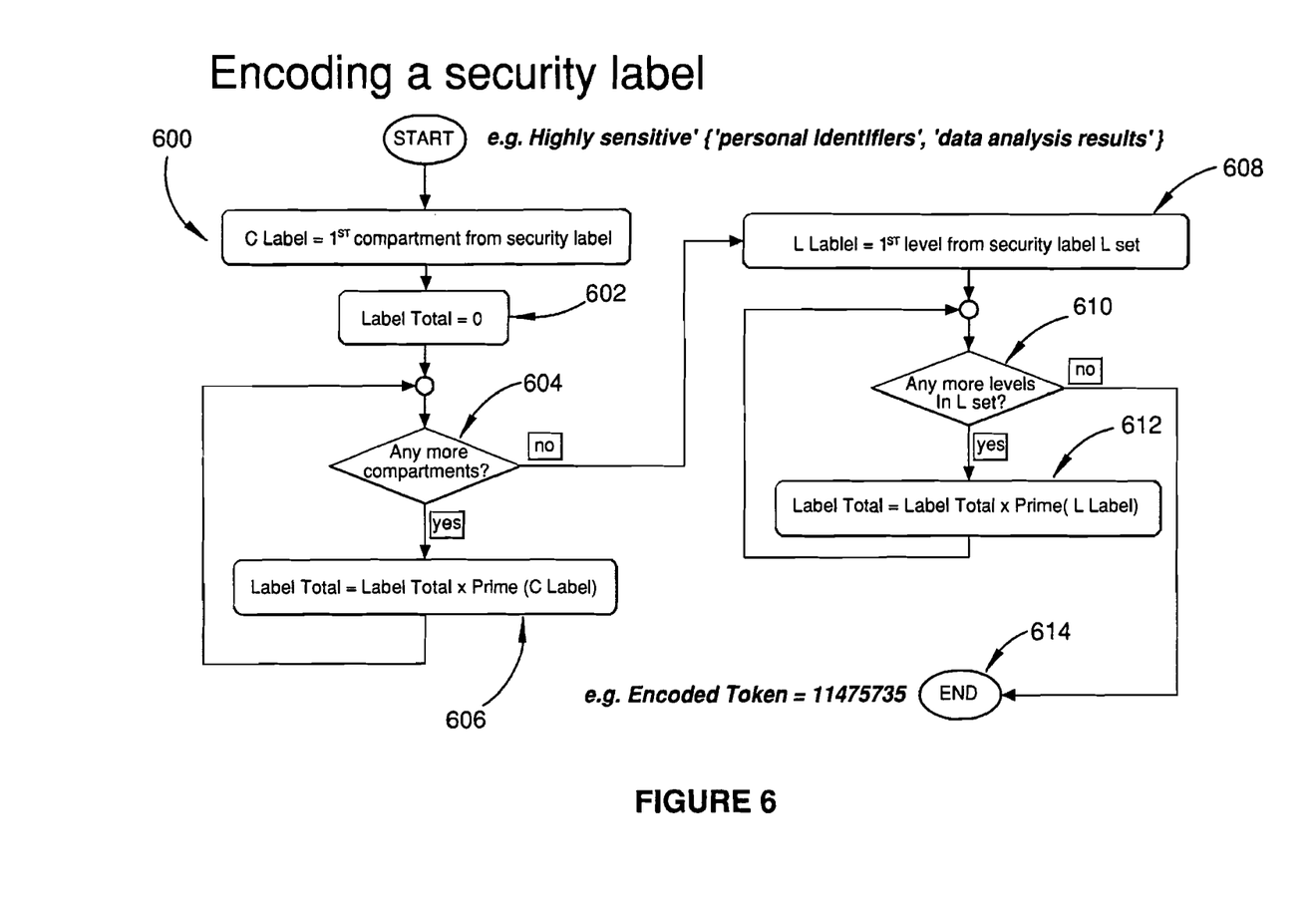

The method steps for this process are outlined in FIG. 6, where a particular label is encoded. Firstly at 600, the value for the first compartment from the security label is set and the label total is set to zero (602). Secondly, the compartment list is accessed, to determine whether there are any more compartments (604). If yes, then the label total becomes the label total multiplied by the prime value ascribed to the compartment label (606). This process is iterated until all compartment values have been added to the token. Once there are no more compartments, the value for the first level from the security label is set (608), and a determination is made as to whether there are any more levels in the label set (610). If so, then the label total becomes the label total multiplied by the prime value ascribed to the level label (612). Once there are no more levels in the L set, the process terminates (614).

The process may also be described by reference to the example below. Data which is highly sensitive and relates to both personal identifiers and data analysis results is ascribed the label 'Highly sensitive' {'personal identifiers', 'data analysis results'} is encoded as:

$$37 \times 31 \times 29 \times 23 \times 3 \times 5 = 11475735$$

The labels 'highly sensitive', 'sensitive', 'restricted' and 'public' are encoded as a set. That is, if the level of 'highly sensitive' is required, by implication, all other lower levels are included in the set of labels. In another example, the label data which is publicly available and relates to HPV risk factors can be ascribed the label 'Public' {'HPV risk factors'} which is encoded as:

$$23 \times 19 = 437$$

The atomic nature of prime numbers ensures every combination is represented by a unique integer number.

If the initial labels are encrypted, the encoding process remains valid and the algorithms may still be employed.

For example, referring to Example 3, the label 'personal identifiers', can first be transformed to an encrypted string using a one way encryption algorithm, prior to being encoded as an integer:

'personal identifiers'→'$#&RERs*Er %$m<ydfg' which is then encoded as an integer:

'$#&RERs*Er %$m<ydfg'=1

In this way, labels may be obfuscated further.

Decoding the integer to arrive at the appropriate semantic structure (i.e. combination of levels and compartments) may be achieved by iteratively identifying each label using a modulo function.

For example, decoding 11475735 would occur using the following methodology:

modulo(11475735, 3) personal identifiers—remainder 0; is a token
modulo(11475735, 5) data analysis results—remainder 0; is a token
modulo(11475735, 7) DNA results—remainder 5; not a token
modulo(11475735, 11) colposcopy results—remainder 7; not a token
modulo(11475735, 13) security management—remainder 11; not a token
modulo(11475735, 17) HPV statistics—remainder 4; not a token
modulo(11475735, 19) HPV risk factors—remainder 1; not a token
modulo(11475735, 23) Public—remainder 0; is a token
modulo(11475735, 29) Restricted—remainder 0; is a token
modulo(11475735, 31) Sensitive—remainder 0; is a token
modulo(11475735, 37) Highly sensitive—remainder 0; is a token As such, the original token is reconstructed:

'Highly sensitive' {'personal identifiers', 'data analysis results'}.

Figure 7:
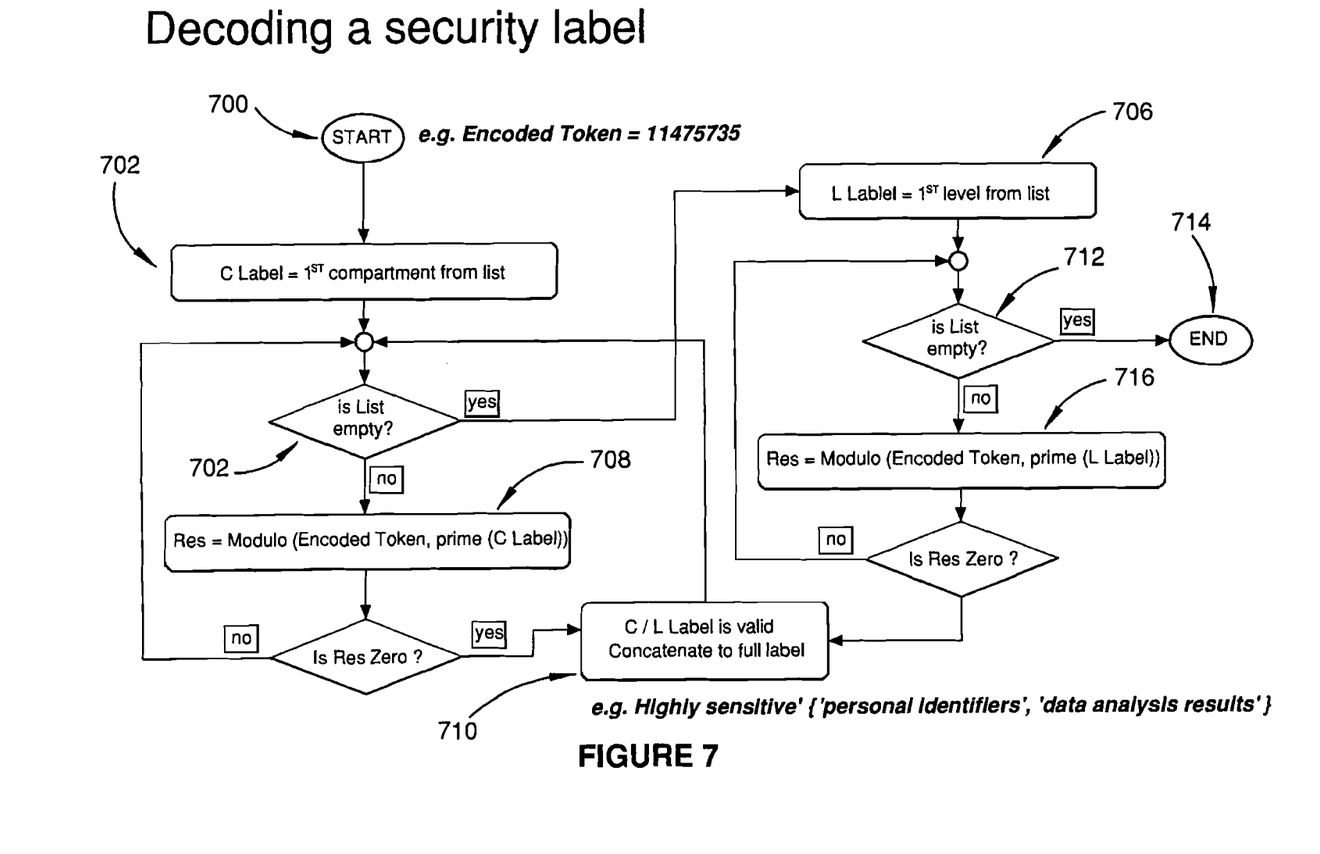

The decoding methodology is shown in FIG. 7. At step 700, the token integer is received by the process. The first compartment from the list is examined (702) and a determination is made as to whether the list is empty (704). If the list is empty, the label becomes the first level from the list (706). If the list is not empty, the modulo of the encoded token is taken (708). If the result of the modulo function is non-zero then the process returns to the step of determining whether the list is empty (704), else the current compartment label is valid and is added to the compartment label list (710) and the process returns to the step of determining whether the list is empty. Returning to the case where the compartment label list is empty and the level label becomes the next level from the list (706), a determination is made as to whether the list is empty (712). If the list is empty, there are no more labels and the process terminates (714). If the list is not empty, the modulo of the encoded token is taken (716). If the result of the modulo function is non-zero then the process returns to the step of determining whether the list is empty (712), else the current label is valid and is added to the label list (710) and the process returns to the step of determining whether the list is empty.

These methods of creating, encoding and decoding security tokens provide a number of advantages over traditional 'bit vector' encoding.

Firstly, ease of transmission is enhanced, as only a single integer need be transmitted. Correspondingly, storage needs are also reduced (or, in other words, compression of information is maximised), as only a single integer need be stored to describe each token.

Manipulation of tokens is also ideally made simpler, as a simple encoding and decoding methodology is utilised.

Moreover, the mechanics of encoding and decoding tokens is decoupled from the semantics of the token. As the token is presented as a single integer, the semantics of the token are obfuscated from the casual observer. The casual observer cannot derive any information from the token per se, but requires knowledge of the encoding methodology, the base used, and knowledge on how the integer maps onto the token structure.

Lastly, the prior art bit vector approach is inherently limiting, as the number of levels and compartments available must be fixed prior to implementation of a security system. The embodiment of the present invention may be modified, in situ, to add additional levels and compartments, without any need to change the fundamental structures of the security system. Therefore, the embodiment described herein offers more flexibility when encoding semantics.

It will be understood that while the preceding examples utilise either a base 2 exponential form or a prime number base for convenience, any base may be utilised.

The encoding system described above may also be utilised in combination with a dominance relation, to further enhance security flow within a database. A dominance relation is a relation where the ability of a user to access information is determined by whether they have "dominance" over the information. Put another way, the user must have a permission level which is equal to or greater than the permission level required to access the information.

A user token must dominate the information token for the user to gain access to the information. The user token must be of a greater level than the information token and the compartments must be a superset of the information token compartments.

In the context of the labelling system described above, the relation is binary and access is granted if the user's label dominates the label associated with the information requested.

For example, if the user Bob has a security label which includes the categories 'Highly sensitive' {'personal identifiers', 'data analysis results', 'HPV risk factors} then Bob will dominate a Microsoft Word™ document which has a label 'Public' {'HPV risk factors'}.

The example given above is an example of a binary dominance relationship.

The embodiment described herein utilises a triadic dominance system relation.

In such a relation, there are three types of tokens. There is a user token (associated with a user), an information token (associated with a particular fragment of information, such as a database entry or a file) and an application token (associated with the action requested by the user, such as writing to the file or database, reading from the file or database, using a particular software application to access the information, etc.).

In such a triadic relationship, both the 'user token' and the 'application token' (intended action) of the application requested by the user to access/manipulate the information has to dominate the 'information token' for the action to be allowed.

A triadic relationship is best explained by reference to an example. In the example, it is assumed that a user wants to read or update a piece of information. To access the piece of information, the user must not only dominate the information, but must also have the right "tool" (processing resource) to access the information.

For example, user Bob may want to gain access to a document called "security101" to word process the document (e.g. to add an entry). The user Bob has a security token, the word processing application has a security token and the document security101 has a security token.

For Bob to be able to word process security 101:
1. Bob's token must dominate the information token; and
2. The word processing token must dominate the information token.

Only if both dominance relations are true can Bob 'word process' the document security 101.

The process is illustrated with reference to FIGS. 8 and 9. It should be noted that the process illustrated with reference to FIGS. 8 and 9 are relevant for an embodiment where an exponential encoding process is utilised.

Figure 8:
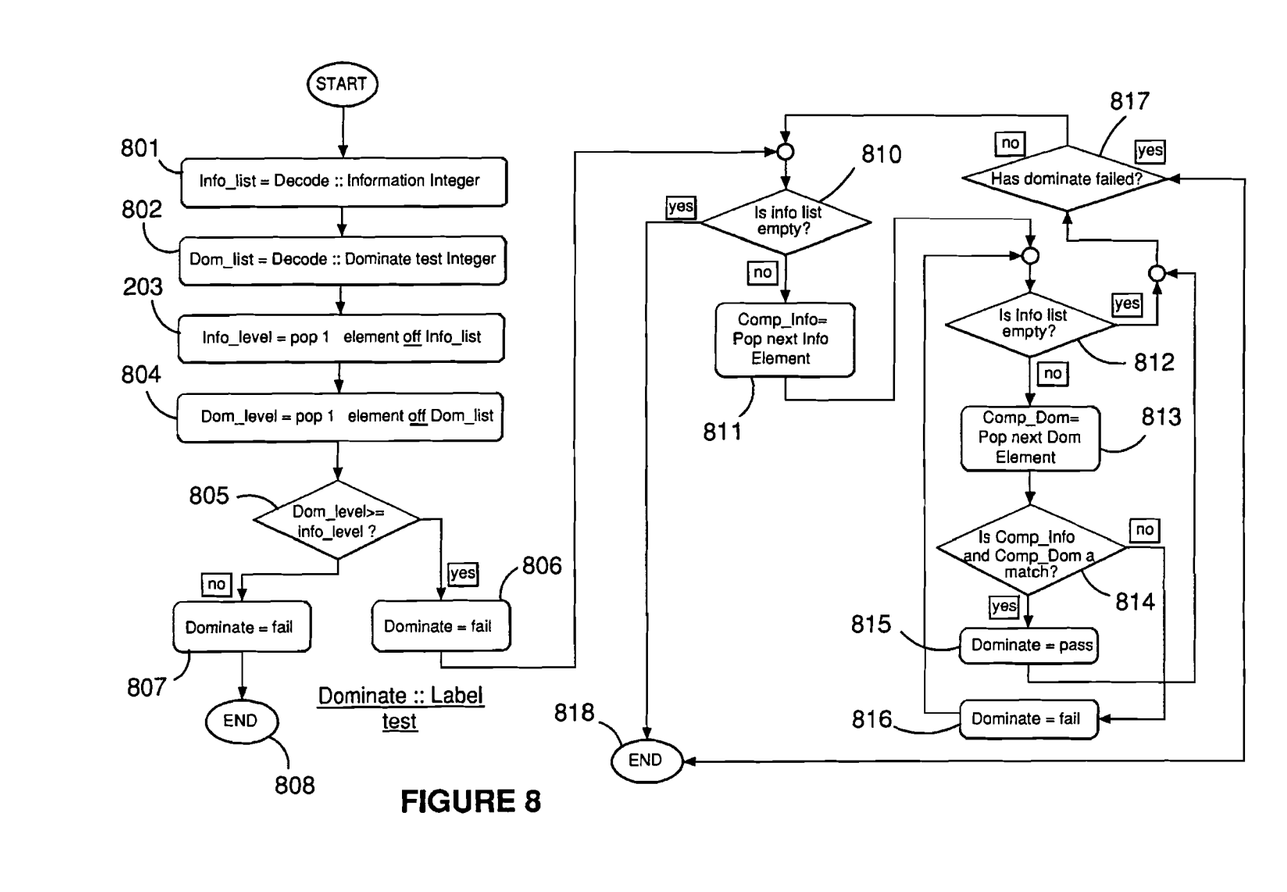
FIG. 8 is a flowchart depicting the process for determining a binary dominance relation for a security system in accordance with an embodiment of the present invention.
Figure 9:
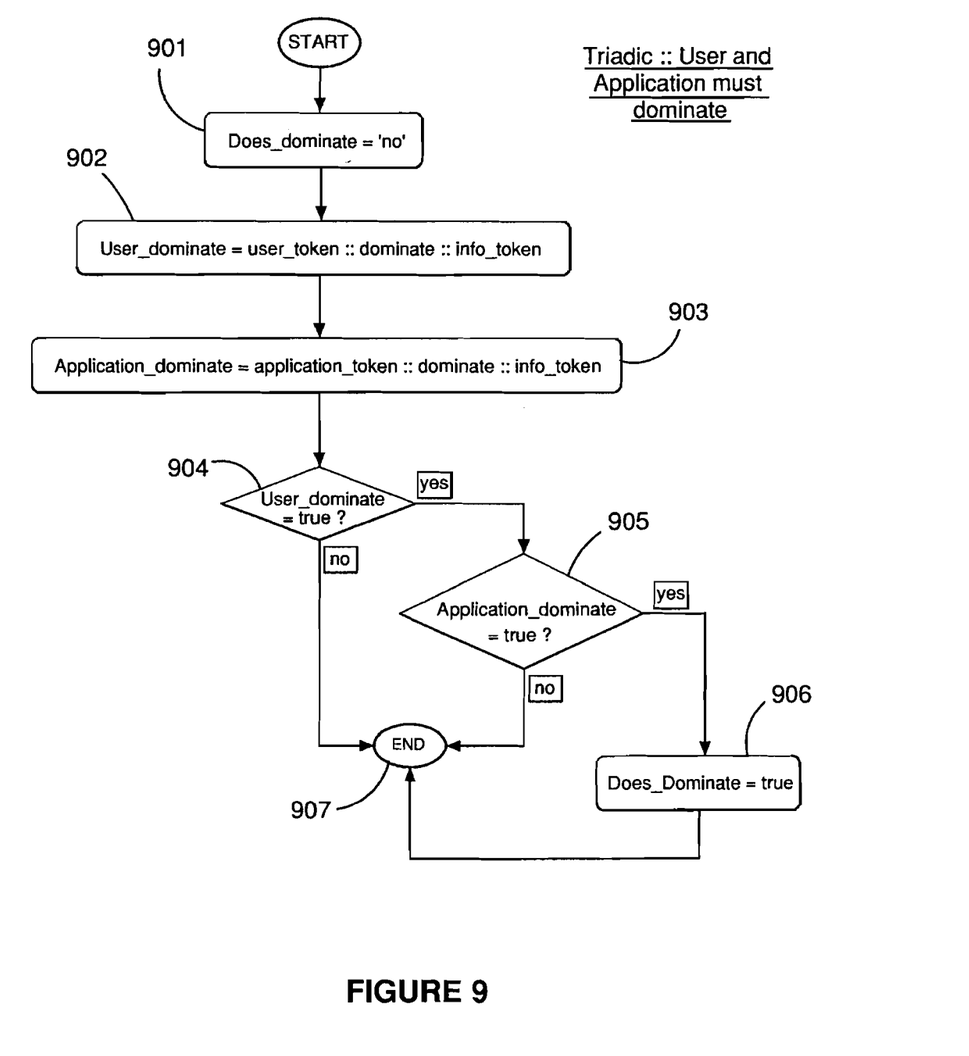
FIG. 9 is a flowchart depicting the process for determining a triadic dominance relation for a security system in accordance with an embodiment of the present invention.

Referring to FIG. 8, the integer is decoded into an information security label list—'Info list' (801). The integer is subsequently decoded into a security label list ('Dom_list') of the user or application that will be tested for dominance against the info_list (802). Pop the first element off the info_list (803). Pop the first element off the Dom_list (804). Check that the first element of the Dom_list is greater the first element of the info_list. If the Dom level is less than the info level the dominate function fails (807) and the algorithm ends (808). Else, if Dom_level is greater than the info_level, proceed to determine if the compartment list (info_list) is empty (810). The dominate flag is set to failure (806) on the assumption that the compartments of the user or application (Comp_dom) won't be a superset of the compartments of the info_list (Comp_info) or the remaining info_list has an empty set of compartments.

If the compartment is empty (810) the algorithm is terminated (818). If the info_list is empty (810), the dominance relation will have either failed (Dominate Flag=fail) or the dominance relation will have passed (Dominate Flag=pass).

If the info_list is not empty (810), the first compartment is popped off the Comp_info (811) and then a check is made to determine whether the Dom_list is empty (812). If the Dom_list is empty (812) the dominate function is checked to ensure it has not failed (817) and the algorithm moves onto the next element in the info_list (810) repeating the process for all elements in the Comp_info_list.

If the dominate function has failed (817) (that is the dominate flag has been set to fail) the algorithm is terminated (818). If the Dom_list remaining is not empty (812) the next compartment (Dom element) is popped off the Dom_list (813) and checked for a match with the compartment from the Comp_info_list (814). If no match is found the Dominate flag is set to 'fail' (816), otherwise the dominate flag is set to pass (815). The process (812, 813, 814) is repeated using the list of Comp_Dom searching for a match with the current info_element that would set the Dominate flag to pass (815).

Referring now to FIG. 9, there is outlined a triadic relationship. The 'does_dominate' flag is initially set to 'no' (901). Using the algorithm of FIG. 8, the 'user_token dominate the info_token' function is executed returning a result user_dominate (802). Using the algorithm of FIG. 8, the 'application_token dominate the info_token' function is executed returning a result application dominate (903).

If the user_dominate flag is true (904) a check is made to determine whether the application dominate flag is true (905).

If it is true, the triadic relation 'Does_dominate flag' (906) is set to true and the algorithm terminates (907).

Otherwise, if either the user_dominate flag is 'false' and/or if the application dominate flag is false the Does dominate flag is false (as originally set) and the algorithm terminates (907).

The dominance relation can be combined with the label encoding to enhance security in a computing system or in a database structure. For large data sets such as the database component of a computer system all combinations of security labels are represented as encoded integers (ordered pairs) and all combinations of the dominance relations are executed prior to being utilised in the database and the access result pass (1) or fail (0) is stored with the ordered pair. This is best illustrated by the following example (where base 2 is used purely for convenience):

Step 1—The Security Labels are Encoded as Integers:
  compartments=[pathology, cardio]
  pathology=2
  cardio=4
  levels=[public, secret]
  public=8
  secret=16
Step 2—The Level Compartments May then be Combined:
  secret [pathology]=16+2=18
  secret [Cardio]=16+4=20
  secret [pathology, cardio]=16+2+4=22
  public [pathology]=8+2=10
  public [Cardio]=8+4=12
  public [pathology, cardio]=8+2+4=14
Step 3—This Allows the Creation of Combination Dominance Tuples:
  secret [pathology] dominate public [pathology]=<18, 10, 1> secret [Cardio] dominate secret [pathology, cardio]=<20, 22, 0> secret [pathology, cardio] dominate secret [Cardio]=<22, 20, 1> public [cardio] dominate secret [Cardio]=<12, 20, 0> secret [cardio] dominate public [Cardio]=<20, 12, 1>

As can be seen from the example above, the dominance function is called to return either a 1 or 0 when creating the list of security combination tuples. Combination tuples and their associated access permission (1 or 0) are loaded into the database for fast table look-up to gain or be denied record access and the associated filtering on any select statement.

Additional speed of access can be gained by filtering the security combination tuples to a list based on the database session of the user, and stored as a table in resident memory when the user logs on.

For example, if a user had the label 'secret [cardio]' only the tuples <20, 22, 0> and <20, 12, 1> (from the example above) would need to be stored in a non volatile memory table for use in that database session. A similar mechanism can be employed to the security labels on the functions (applications) that the user has permission to use.

Once the "security tuple table" is loaded into a database, a single additional SQL line of code in the where clause provides the necessary filtering for information protection.

The triadic dominance relation previously defined is implemented by extending the 'security tuple' concept to cover "application dominate information" in addition to user dominate information".

For example, continuing the example above:
User=secret [pathology, cardio]=22
Applications=secret [cardio]=20
Information=secret [cardio]=20
secret [pathology, cardio] dominate secret [Cardio]=<22, 20, 1>
secret [cardio] dominate secret[Cardio]=<20, 20, 1>

Therefore, the user would have access using the particular set of User, Application and Information security labels.

Where the token is formed utilising prime numbers and modulo arithmetic, for example:

$$\text{'Label 1} = \text{Highly sensitive'}\{\text{'personal identifiers'},$$
$$\text{'data analysis results'}\}$$
$$= 37 \times 31 \times 29 \times 23 \times 3 \times 5$$
$$= 11475735$$

$$\text{label 2} = \text{'Public'}\{\text{'HPV risk factors'}\}$$
$$= 23 \times 19$$
$$= 437$$

The dominance function may now be performed as a modulo function call, namely:

If (information=label 1) (user=label 2) then Label 2 dominates label 1=modulo(437, 11475735) would fail (as not equal to zero);

If (information=label 2) (user=label 1) then Label 1 dominates label 2=modulo(11475735, 437) would also fail (not equal to zero) as 'HPV risk factors' is not part of the user's label to view those details;

If HPV risk factors is then included as part of label 1, ie 11475735*19=218038965 then
Label 1 dominates label 2=modulo(218038965, 437) would then pass (equal to zero) as HPV risk factors' is now part of the user's label to view those details.

This approach enables a database wrapper to be constructed providing row level security to any SQL database.

Moreover, the triadic relationship provides the ability to construct a proxy server which acts as a transparent (from the point of view of the user) shield between the database and the end user, such that content is filtered based on the dominance function described herein. That is, the end user is only allowed access to information based on whether the user "dominates" the information.

Utilising either of the methodologies outlined above, a number of advantages arise. For example, implementation of the method does not require any fundamental change in the way a database is organised, and may be included in existing database structures.

The method also has the effect of hiding (making non existent) data to any user or application where the security tuple characteristics of user or application don't dominate the information token stored at the row level. This provides a level of obfuscation which may deter casual "hackers".

If required, a binary dominance or triadic dominance relation can be implemented at an object messaging level or even embedded at the operating system level and/or communications level, to provide additional security and protection.

Greater flexibility is provided when managing resources allocated to handling the processing of security tagged information.

In addition, where the exponential method is utilised, a table join using encoded information is faster than a database function executing at a row level, when returning or manipulating large amounts of table rows. This preferably speeds processing of any requests.

Embodiments of the invention, when implemented, result in a large number of security labels being generated and utilised. This in turn requires a management system to correctly and efficiently manage the labels.

The management system may be built with reference to a "security model", which is constructed for a particular institution or organisation implementing the security labels within their computer systems. The model would form a blue print of security architecture, implementation and operation.

An organisation would identify risks (threats) and mitigate these risks by the design of an appropriate security label architecture. The security label architecture could include a number of conceptual groupings, including:
roles of people;
role levels;
compartments; and
applications (functions).

The groupings may then be organised into an appropriate security label dominance hierarchy and a set of rules may be devised to allow the label interaction necessary to mitigate the identified risks (threats).

To enable a successful implementation of the invention, a model of security labels can be implemented using the UML modelling notation that can be extended to cover all the concepts of security labels embodied in an embodiment of the invention described herein.

The following steps outline one methodology which may be utilised to build an appropriate organisational security model architecture.
1. "Use Case Diagrams" In particular the analysis of the system's "actors" (and actor hierarchy) will identify the various initial levels of security required to mitigate any candidate list of threats (or Threat tree) in terms of the "actors" (users and other systems) of the system under study. The various security 'levels' would be annotated or recorded onto the Use Case diagram.
2. "Use Case Diagrams" In particular the analysis of "use cases" (processes or services) will identify the various initial levels of security required to mitigate any candidate list of threats (or Threat tree) in terms of applications (function). The various security 'levels' would be annotated or recorded onto the Use Case diagram.

3. "Use Case Diagrams" In particular the analysis of "actor" and "use cases" interacting (The interaction between user, other systems and services) will clarify the various levels of security identified in STEP 1 and STEP 2 and identify the appropriate set of compartments required to mitigate any candidate list of threats (or Threat tree) in terms of applications and user interactions. The various security 'levels' and 'compartments' would be annotated or recorded onto the Use Case diagram.

4. "Class Diagrams" In particular analysis of "object classes" and "object class association" will enable the identification of where to implement security labels (level and compartments) into the software architecture. The various security 'levels' and 'compartments' would be annotated or recorded onto the class diagram as 'methods' and 'attributes' of object classes.

5. "Object Interaction Diagrams" and "Object Sequence Diagrams" would be used to walk through the dynamics of security label dominance (subject dominate object), both binary and triadic as described above. The intention is to understand the dynamics of gating (access and closure) produced by the interaction of security labels.

6. "Entity Relationship Modelling Diagrams" (Not part of the UML method) should be annotated with security labels (attributes of tables) either independently modelled for a specific data architecture or derived from the previous UML modelling, STEP 1 to STEP 5 above.

7. "Object Interaction Diagrams" and "Object Sequence Diagrams" should be revisited post STEP 7, this time with a view to reviewing the messaging architecture. Mitigate risks of messaging between systems and between objects classes interacting i.e. "class methods" in addition to the "object method" interactions.

By carrying out the above STEPS, the security model for a 'n' tier computer system architecture provides a number of advantages. "Data layer" threats are mitigated by a security label configuration associated at both the table and row level.

"Middle tier layer" threats are mitigated by a security label arrangement on object class instantiations, resulting in security controls on object and class messaging interactions.

Security labels embedded in the encrypted communications layer mitigate threats from "User" and "External System" interactions. Standard encryption algorithms such as RSA can be used to encapsulate the security labels.

It will be understood that while the preceding examples utilise a base 2 exponential form for convenience, any base may be utilised.

It will also be understood that whilst the tokens described herein are labels utilised to control access to information in a database, the same concept may be applied to the categorisation and protection of information in other computing areas, such as to control messaging between software objects, or control communications between computing systems.

It will also be understood that whilst the described embodiments referred to a medical application/classification system, embodiments of the method and system in accordance with the present invention may be utilised in any type of computing system, or any type of database, to hold any type of data, using any appropriate combination of security levels and compartments.

The invention claimed is:

1. A computerized method for encoding an information security label associated with a set of information in a database in a file and utilizable in a computing system for controlling read access to the set of information, the database being accessed by one or more users, the information security label containing characteristics describing the set of information, said method comprising:
   assigning, by the computing system, a unique integer value to each characteristic of a set of characteristics, the set comprising a plurality of characteristics;
   identifying, for each piece of information in the database, at least one characteristic describing the piece of information, wherein the set of characteristics comprises pieces of information having at least one characteristic that is identical;
   where a piece of information has more than one characteristic, combining, by the computing system, the integer values assigned to each characteristic of the set of characteristics that describe the information security label into an encoded information security label, said encoded information security label obfuscating each characteristic of the set of characteristics; and,
   decoding the information security label, said decoding comprising:
   (a) identifying a base for use in encoding the information security label; and
   (b) determining, by the computing system, a floor of a logarithm to the identified base of the encoded information security label to determine a value for a first characteristic of the set of characteristics.

2. The method of claim 1, wherein the integer value assigned to each characteristic of the set of characteristics is determined by an exponential in the form $x^y$, where x and y are positive integer values.

3. The method of claim 2, wherein assigning an integer value to each characteristic of the set of characteristics further comprises incrementing the exponent y for each characteristic of the set of characteristics.

4. The method of claim 1, wherein the assigned integer values are combined by summing the assigned integer values.

5. The method of claim 4, wherein each assigned integer value is a unique prime number.

6. The method of claim 5, wherein the assigned integer values are combined by multiplying the assigned integer values.

7. The method of claim 5, further comprising decoding the information security label, said method comprising:
   performing, by the computing system, a modulo operation on a resulting integer; and
   determining, by the computing system, that a particular characteristic is inherent in the security label when the performed modulo operation has a zero remainder value.

8. The method of claim 1, wherein the set of characteristics is one of a permission level and a compartment.

9. The method of claim 1, wherein decoding the information security label further comprises:
   (c) subtracting, by the computing system, the floor of the log from the encoded information security label to produce a remainder integer value;
   (d) when the remainder integer value is non-zero, determining, by the computing system, the floor of the log of the remainder integer value to determine a further characteristic of the set of characteristics; and
   (e) subtracting, by the computer system, the floor of the log of the remainder integer value from the remainder integer value to produce a further remainder integer value;

wherein the steps of (d) and (e) are repeated until the further remainder integer value is zero.

10. A computerized method for providing, to a user of a computing system, read access to a plurality of discrete pieces of information in an information set in a database within a file in the computing system, said method comprising:
encoding, by the computing system, an information security label associated with the set of information in the database in the file, said encoding comprising:
assigning, by the computing system, a unique integer value to each characteristic of a set of characteristics, the set comprising a plurality of characteristics;
identifying, for each piece of information in the database, at least one characteristic describing the piece of information, wherein the set of characteristics comprises pieces of information having at least one characteristic that is identical;
where a piece of information has more than one characteristic, combining, by the computing system, the integer values assigned to each characteristic of the set of characteristics that describe the information security label into an encoded information security label, said encoded information security label obfuscating each characteristic of the set of characteristics;
decoding the information security label, said decoding comprising:
(a) identifying a base for use in encoding the information security label; and
(b) determining, by the computing system, a floor of a logarithm to the identified base of the encoded information security label to determine a value for a first characteristic of the set of characteristics;
assigning, by the computing system, each user of the computing system a user security label based on a security level assigned to said user;
assigning, by the computing system, each software application residing on the computer system a corresponding application security label;
receiving, by the computer system, a user request to access one or more particular discrete pieces of information within the database; and
providing, by the computing system, read access to a set of one or more particular discrete pieces of information in the database when the user security label and the application security label dominate the encoded information security label associated with the set of one or more particular discrete pieces of information.

11. The method of claim 10, wherein:
said computing system has a plurality of users; and
said method further comprises constructing a user access list containing information pertaining to whether each one of the plurality of users has access to each piece of the plurality of pieces of information in the information set, said constructing comprising:
determining a first security token for each of the users;
determining a second security token for each of the plurality of discrete pieces of information in the information set;
determining whether each of the plurality of users has access to each of the plurality of discrete pieces of information in the information set by comparing the first and second security tokens; and
constructing the user access list of the security tokens and access permissions.

12. A system for encoding an information security label associated with a set of information in a database in a file and utilizable in a computing system for controlling read access to the set of information, the database being accessed by one or more users, the information security label containing characteristics describing the set of information, said system comprising:
one or more non-transitory computer-readable storage media having stored thereon computer-executable instructions for:
assigning, by the computing system, a unique integer value to each characteristic of a set of characteristics, the set comprising a plurality of characteristics;
identifying, for each piece of information in the database, at least one characteristic describing the piece of information, wherein the set of characteristics comprises pieces of information having at least one characteristic that is identical;
where the piece of information has more than one characteristic, combining, by the computing system, the assigned integer values for each characteristic of the set of characteristics that describe the information security label into an encoded information security label, said encoded information security label obfuscating each characteristic of the set of characteristics; and
decoding the information security label, said decoding comprising:
(a) identifying a base used in encoding the information security label; and
(b) determining, by the computing system, a floor of a logarithm to the identified base of the encoded information security label to determine a value for a first characteristic of the set of characteristics; and
a computer for executing the computer-executable instructions stored on the computer-readable storage media.

13. The system of claim 12, wherein the integer value assigned to each characteristic of the set of characteristics is determined by an exponential in the form $x^y$, where x and y are positive integer values.

14. The system of claim 13, wherein assigning an integer value to each characteristic of the set of characteristics further comprises incrementing the exponent y for each characteristic of the set of characteristics.

15. The system of claim 14, wherein decoding the information security label further comprises:
(c) subtracting, by the computing system, the floor of the log from the encoded information security label to produce a remainder integer value;
(d) when the remainder integer value is non-zero, determining, by the computing system, the floor of the log of the remainder integer value to determine a further characteristic of the set of characteristics; and
(e) subtracting, by the computer system, the floor of the log of the remainder integer value to form the remainder integer value to produce a further remainder integer value;
wherein the steps of (d) and (e) are repeated until the further remainder integer value is zero.

16. The system of claim 12, wherein the assigned integer values are combined by summing the assigned integer values.

17. The system of claim 16, wherein each assigned integer value is a unique prime number.

18. The system of claim 17, wherein the assigned integer values are combined by multiplying the assigned integer values.

19. The system of claim 17, wherein said computer-executable instructions further comprise decoding the information security label, said decoding comprising:

performing, by the computing system, a modulo operation on a resulting integer; and determining, by the computing system, that a particular characteristic is inherent in the security label when the performed modulo operation has a zero remainder value.

20. The system of claim 12, wherein the set of characteristics is one of a permission level and a compartment.

* * * * *